April 9, 1935. E. M. SIMS 1,996,775
METHOD AND APPARATUS FOR WELDING TUBES
Filed Nov. 25, 1933
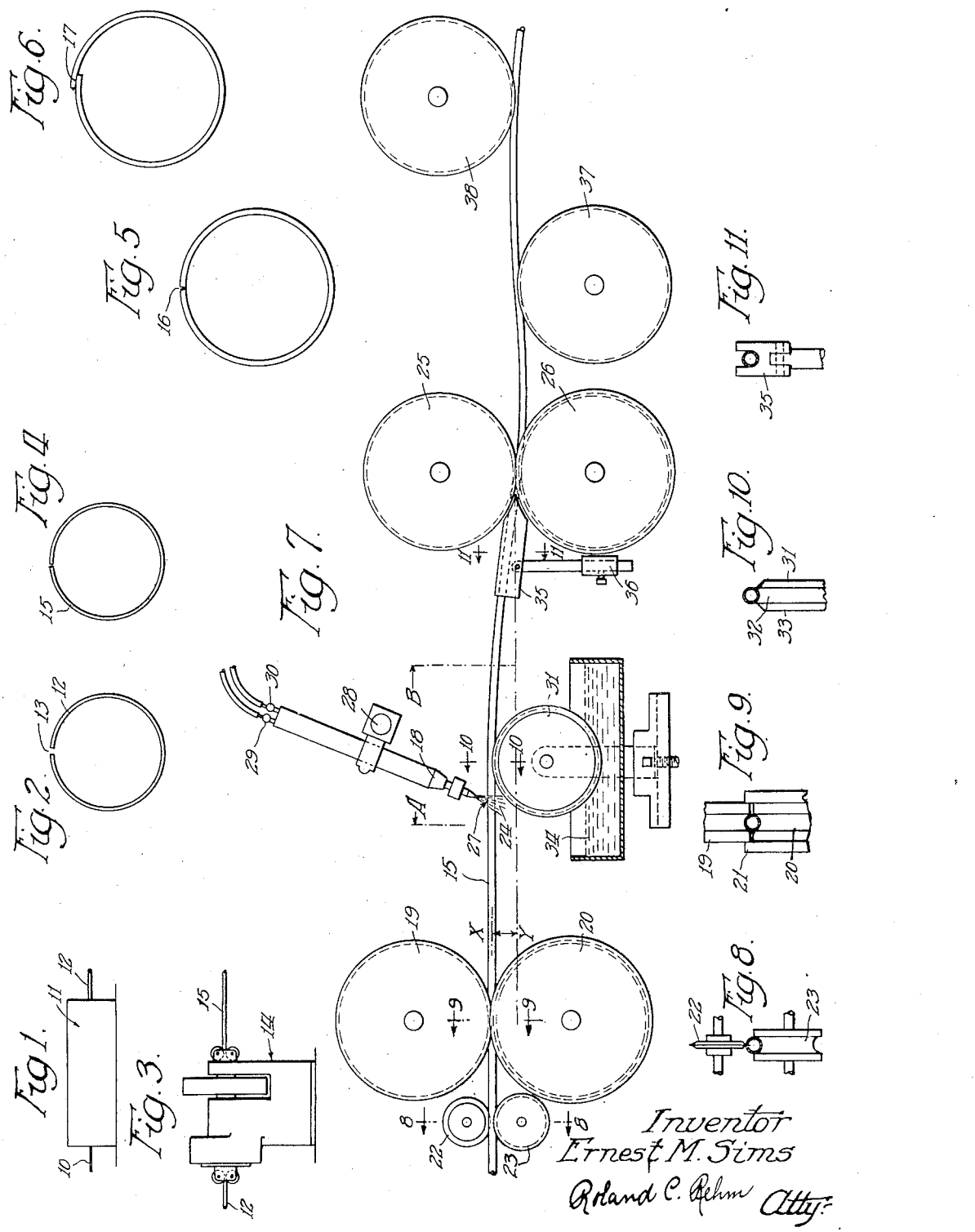

Patented Apr. 9, 1935

1,996,775

UNITED STATES PATENT OFFICE 1,996,775

METHOD AND APPARATUS FOR WELDING TUBES

Ernest M. Sims, Elkhart, Ind.

Application November 25, 1933, Serial No. 699,793

12 Claims. (Cl. 113—59)

This invention relates to welding such for example as the butt welding of tubes, and among other objects aims to provide methods and apparatus for improving the weld seam and particularly adapted for the welding of certain alloys.

The nature of the invention may be readily understood by reference to one illustrative method and apparatus for butt welding tubes set forth somewhat diagrammatically in the accompanying drawing.

In said drawing:

Fig. 1 is a diagrammatic representation of tube forming apparatus;

Fig. 2 is an enlarged section of the tube as it issues from the forming apparatus;

Fig. 3 is a diagrammatic representation of swaging apparatus for reducing the gap in the tube;

Fig. 4 is an enlarged cross section of the tube as it issues from the swaging apparatus;

Fig. 5 is a similar cross section of a large tube made from thick gauge metal and showing the edges of the strip in position for welding;

Fig. 6 is a section of such tube as at an intermediate stage of formation illustrating a means for bringing the edges of the strip close together.

Fig. 7 is a diagrammatic elevation of tube welding apparatus;

Fig. 8 is a sectional elevation taken on the plane 8—8 of Fig. 7 showing the tube guiding device;

Fig. 9 is a sectional elevation taken on the plane 9—9 of Fig. 7 and illustrating the contour of the feeding rolls;

Fig. 10 is a sectional elevation taken on the plane 10—10 of Fig. 7 illustrating an accessory roll for maintaining accurate positioning of the tube relative to the welding element; and Fig. 11 is a sectional elevation taken on the plane 11—11 of Fig. 1 showing an accessory device for preventing minor wobbling of the tube.

The illustrative method and apparatus are designed to improve the weld seam and particularly to weld metals which have a tendency to crack when subjected to conventional methods of welding in the usual continuous welding apparatus. The tendency of metals to crack or break when heated to a certain temperature or range of temperatures may conveniently be designated as hot-shortness, i. e., a sort of brittleness which is exhibited in the low percentage of elongation and reduction in area of which a hot-short metal is capable (before breakage) when subjected to tension while in the hot-short range.

The metal may have much greater ductility and resistance to cracking (i. e. the reverse of brittleness) at temperatures above the hot-short range and yet have a much lower tensile strength than that at the hot-short range when it is least ductile.

There are many theories which attempt to explain this phenomena, but generally an effort is made to change the composition of the metal either to eliminate the hot-short property of the metal or to shift it to a range of temperatures where it causes no difficulty. However, some metals and alloys cannot be so altered without changing their characteristic and desired properties, and in such cases one must endeavor to devise welding methods and apparatus which take into account the hot-shortness of the metal.

One metal for example which has a hot-short range at a critical point in the welding process is a nickel alloy comprising 80% nickel, 14% chromium and 6% iron. This metal is sold on the market under the trade name Inconel. The chromium content of the alloy is sufficient to give the metal surface stainlessness without substantially interferring with the ductility and malleability characteristic of nickel alloys. At high temperatures the alloy has the highest resistance to oxidation of any of the known nickel-chromium group of alloys. It also has a high degree of strength at high temperatures and also possesses the important property of being free from inter-granular deterioration at high temperatures. In other words, its desirable characteristics are so important for certain purposes that they cannot be sacrificed for the sake of altering or shifting the hot-short range.

This nickel alloy is hot-short, or more properly red-short, in a range of from 1300 to 1700° F., its maximum brittleness being just above 1400° F. This temperature range is critical since it is entered during the welding process, the welding temperature being about 2600° F., and when the alloy is welded according to conventional practices, it develops minute cracks adjacent the weld which cannot be obliterated by subsequent heat treatment.

Another somewhat less expensive metal designed to serve somewhat the same purposes is a nickel-chromium alloy comprising 65% nickel, 15% chromium, 20% iron, and small amounts of minor elements such as 1% to 1½% of silicon. This alloy is also hot-short and can be advantageously welded by the method and apparatus herein disclosed. There are of course many other known hot-short metals and alloys, but it is unnecessary to catalogue them here since the present invention does not relate to the specific composition of the metal welded.

I have discovered that cracks and other defects in and adjacent the weld may be avoided by welding according to the illustrative process. As applied to butt welding tubing particularly of small diameters (e. g. three-eighths of an inch outside diameter), a tube is first formed from the flat strip according to conventional forming processes, as by passing the strip through a series of rolls which progressively bend it transversely into the desired tubular cross section. This step of the process is diagrammatically indicated in Fig. 1, wherein the flat strip 10 is fed into the forming apparatus 11 and continuously and progressively bent into tubular contour and issues as a tube 12. Forming apparatus of this character is well known and can be purchased on the open market. Its details form no part of this invention. Preferably the tube 12 is cut into lengths (after formation) which are convenient for handling in the subsequent treatment.

Where as in most instances, the metal is springy, the edges of the strip generally cannot be brought together during the forming process sufficiently close for welding. In other words, the gap 13 between the edges of the tube as thus formed (see Fig. 2) is too great for satisfactory welding.

The conventional practice of pressing the edges of the metal together at the welding point to reduce this gap, is not employed in order to avoid setting up strains which may be transmitted to the metal in the hot-short range and also to avoid the formation of a "flash" or ridge inside the tube due to upsetting of the edges of the metal under such side pressure. The absence of a ridge inside the tube is of course important regardless of whether or not the metal requires special treatment because of hot-shortness. Instead of the conventional treatment the tube is treated cold in such a way as to bring the edges of the metal into welding proximity, the weld being as will presently more fully appear, a melt weld wherein the metal is at least superficially actually melted so as to produce a fusion of the metals to form a seam. The welding proximity of the edges of the metal varies according to the thickness of the metal. For thin metal of about .032" thickness, the edges may be separated about .006", but it is not objectional in butt welding thin metal if the edges are actually in contact. For thicker metal, there should be some gap between the metal to permit direct access of the welding heat but the gap should not of course be so great as to allow any molten metal to run down between the edges.

The particular means employed for bringing the edges of the metal into welding proximity is not important. A convenient method is to pass the tube through an ordinary swaging machine 14 (Fig. 3) of conventional design which delivers a multitude of relatively light blows over the surface of the tube as it passes through the machine. This operation on the tube may be performed without the use of a mandrel inside the tube since it is desired in this operation to do nothing more than to bring the edges of the tube into welding proximity. Tube swaging apparatus of this character is well known and can be purchased on the open market. Its details form no part of this invention. The tube 12 is fed continuously into one side of the machine and issues at the other side with the gap 13 reduced as indicated diagrammatically by the tube 15, Fig. 4.

The edges of heavy gauge metal strip will naturally form a sort of V-shaped groove 16 (Fig. 5) which can be closed at the bottom and yet expose the edges of the metal to the welding heat. If the metal be so springy as to make it difficult to bring the edges of large diameter tubing (e. g. 1½" O. D.) together sufficiently closely by swaging, or if swaging be undesirable for other reasons, the tube may be formed at an intermediate stage with its edges in overlapping relation, as shown at 17 (Fig. 6) and then later separated preferably at a later stage in the forming machine itself and shifted into abutting relationship. By this method any width of gap from actual contact upward, may be secured at the seam and the tube thereby prepared with the edges of the strip in proper welding proximity in relation to gauge of metal employed.

As thus prepared, the tube is subjected to welding, advantageously a continuous welding process, in such a way that the tube is not subjected to external stresses, while it is passing through a critical range of temperatures. In other words, the tube is unrestrained during such range and is left free to assume the position or curvature which is natural for it. As indicated above, contrary to common practice, external pressure is not exerted upon the tube at the welding point.

The application of the invention to a continuous welding apparatus wherein the tube travels and the heating element remains stationary is illustrated in Fig. 7. There the tube is advanced to the heating element 18 by the leading pair of feed rolls 19 and 20. The lower feeding roll 20 is advantageously provided with flanges 21 (Fig. 9) to maintain the rolls in exact alignment. The upper roll 19 is vertically adjustable to permit variation of the pressure with which the tube is gripped. Proper alignment of the edges of the butt joint with the heating element is maintained (i. e. twisting of the tube is prevented) by a guide roll 22 or equivalent guiding fin whose sharp edge enters between the edge of the strip (Fig. 8). The resilient character of the tube causes the edges to spring back to their original relation after they pass the guide roll. Opposite the guide is a supporting roll 23. The guide roll should of course be set close enough to the welding point to insure that the seam will not twist out of exact alignment before it reaches the welding point.

The heating element 18 is here represented by an adjustable single jet oxyacetylene torch which for nickel alloys should be slightly reducing in character, that is, there is a slight excess of acetylene. The welding process causes the tube to curve downwardly (see Fig. 6) i. e., to be convex upwardly. This is probably due to the fact that, although the flame extends about the sides of the tube as indicated at 24, and thus heats them to a bright red heat, the jet directly striking only the top side of the tube elevates it to a higher temperature, thereby causing it to expand to a greater degree than the bottom, thus producing the aforesaid curvature.

The leading feed rolls 19 and 20 and the trailing feed rolls 25 and 26 beyond the welding point are separated a distance sufficient to insure that the critical range of temperatures, i. e., the hot-short range, will occur well between the rolls, and the heating element 18 is of course preferably positioned approximately midway between the rolls or at any rate at such a distance from each of the pairs of rolls that the temperature gradient from the welding point to the rolls passes well out of the aforesaid hot-short range before the rolls are reached. In the present instance, the separation between the pairs of rolls is about twenty-one inches and the welding point 27 (i. e., where the apex of the jet strikes the tube) is about twelve and one-fourth inches in advance of the bight of the trailing rolls 25 and 26. The bights between the respective pairs of feed rolls are so arranged relative to the curvature of the tube as to impose no bending action or other stresses upon the length of tube between the rolls and particularly upon that length of tube which is in the hot-short range, such length being here represented approximately as the length A—B. This is effected in the present instance by elevating the leading pair of feed rolls slightly (as indicated by X—Y) above the trailing pair by a distance sufficient to allow for the downward curvature of the tube. Thus the tube following its natural curvature exactly enters the bight between the trailing rolls without necessitating any substantial deflection. For a three-eighth inch O. D. tube made of strip .032" in thickness, the leading pair of rolls 19 and 20 is elevated about three-fourths of an inch above the trailing rolls 25 and 26.

The trailing rolls are also arranged so that in passing between the rolls there is no unnatural bending of the tube such as would cause the transfer of any stress to the hot-short region. In this connection it should be explained that on cooling the tube tends to curl up and if it were not straightened (after it has well passed the hot-short range) it would permanently assume a curvature in the reverse direction, i. e., concave upwardly. Such reversing of curvature is probably due to the fact that the top portion of the tube, i. e. the weld seam, contracts more than the normal amount owing either to the condition of the weld seam or the high temperatures reached at the weld. Hence at some point after the tube leaves the hot-short range A—B it starts to curve in the opposite direction, and this phenomena should be recognized so as to avoid transmitting any stresses to the tube in the hot-short range A—B.

Obviously other relative arrangements of the rolls would accomplish the same purpose. For example, the leading rolls 19 and 20 may be set to cause the tube to feed upwardly at such an angle that its natural curvature would carry it down exactly into register with the trailing pair of feed rolls,—the purpose being, as stated above, to adjust the feed rolls to the natural curvature or shape of the tube and not force the tube to accommodate itself to a given setting of feed rolls such as might impose stresses in that part of the tube in the hot-short range. It should be understood of course that the respective feeding rolls are power driven and their driving mechanism is so coordinated as to drive them at the same speed.

The proximity of the jet to the tube is adjusted by an adjusting device 28 and by manipulation of gas valves 29 and 30 to maintain a slight superficially melted area at the point 27 whose width extends perhaps one-eigth of an inch on opposite sides of the seam for a three-eighths inch O. D. tube. For the nickel alloy (inconel) the superficially melted area is pear shaped with the apex pointing away from the point of weld. The reducing atmosphere around the weld prevents the formation of a film over the pool of melted metal. Apparently with nickel chromium alloys the absence of an oxide film is of relatively greater importance than with iron and steel which can be welded in the presence of oxide scale. For larger diameters the melted area may advantageously be a little wider. The speed of feed of the tube is of course adjusted to maintain the proper melted area and of course is made great enough so that the tube walls are not brought to such a soft condition throughout as to sag objectionably along the line of weld. In the present process a slight sagging of the tube wall at the weld is not serious. The absence of side or other pressure at the weld avoids any upsetting of the metal at the weld to produce a thicker seam and a ridge inside the tube at the weld seam. Whereas a tube with a sagging wall which is substantially the same thickness at the weld seam as the balance of the tube wall (that being the kind of weld seam produced by the present process) may be restored to proper position by a simple swaging operation over a mandrel, the reduction of a ridge inside at the weld seam inside the tube is most difficult. The production of a weld seam without the thick ridge is highly advantageous since many specifications require a tube of uniform wall thickness.

As stated elsewhere, a slight but substantially uniform gap is advantageously left between the edges of the strip for a thick walled tube to expose the edges of the metal directly to the welding heat. Though the metal is superficially melted it does not run down through the gap nor form a thick ridge inside the tube. The weld seam thickness being uniform with the tube wall, sagging of the wall at the weld can easily be removed by simple swaging as aforesaid.

To effect proper adjustment of the jet the adjusting support permits movement of the jet from side to side as well as toward and away from the tube. The apparatus is provided with an appropriate speed change device for varying the speed of the feed rolls.

Preferably the welding element comprises a single jet instead of a plurality of jets arranged along the tube so that there is less likelihood of the tube being exposed to the air while at a very high temperature. It will be understood that the invention is not however limited to the use of an oxyacetylene flame. For example, the atomic hydrogen torch has a number of points of advantage such as a carbon-free reducing atmosphere. Electric welding while theoretically suitable is not recommended since the speed at which the tube would be required to travel (which may reach as high as sixty feet per minute) makes it difficult to inspect the weld while the tube is in motion and therefore results in too great a waste of tube before any malfunction or improper adjustment of the welding apparatus is detected. This is of particular importance where expensive metals such as high nickel alloys are welded. Moreover the welding of small diameter tubing by the continuous process is most difficult if not impossible. In electric welding it is deemed preferable to weld a large diameter tube and then draw it down cold to small diameter by one or more passes. With a nickel alloy of this character cold drawing down is most expensive since the tube must be leaded to lubricate the drawing dies.

The apparatus may advantageously be provided with a safety aligning roll, and is here shown provided with a roll 31 located just beyond the welding point. The function of the roll is not to direct the travel of the tube in any way which might impose any stresses thereon but merely to insure that the tube will maintain strict alignment with the apex of the welding jet and will not wobble slightly from time to time. The restraint to such very slight side wobbling is so insignificant as not to impose any stress on the tube which would be likely to develop any cracking strains in the hot-short range. Moreover, it is quite probable that the guiding action of the roll is felt in the region immediately adjacent the welding point where the tube is above the hot-short range. The roll is adjustable both vertically and laterally so that it may be located with reference to the natural course which the tube takes. This position having been determined, the roll is adjusted to it and therefore does not function in any way to alter the natural course of the tube but merely to guard against possible slight wobbling of the tube with reference to the apex of the welding jet. As here shown, the roll is preferably located so that the flame of the torch will not impinge directly on it. In this case the top of the roll is about an inch and a quarter beyond the tip of the torch. The supporting groove 32 in the roll is made relatively narrow, and the sides 33 thereof slope sharply away so as to avoid minimum interference with the free flow of heat around the tube. The roll preferably turns in a water tank 34 provided for cooling purposes.

An adjustable guide 35 (see Figs. 7 and 11) may advantageously be provided to counteract any wobbling of the tube at the trailing feed rolls 25 and 26, particularly when the end of a fresh tube approaches these feed rolls. Here again the guide is adjusted by means of its adjusting clamp 36 to the natural course of the tube and in no way interferes with such natural course but merely counteracts slight wobbling which might occur through unequal or varying temperature changes as the tube cools.

As stated above, the tendency of the tube when cooling is to curve upwardly, i. e., the reverse of its curvature under the action of the welding heat, and if allowed to cool naturally it would assume a rather pronounced curvature in which the weld seam would be located on the concave side of the tube. In order to deliver a reasonably straight tube to facilitate subsequent handling, a pair of straightening rolls 37 and 38 are located beyond the trailing feed rolls 25 and 26 at a point where the tube is relatively cool and well beyond its hot-short range. As here shown, the contraction of the tube along the weld seam starts the upward curvature before the tube reaches the first roll 37 and it passes across the groove in that roll without any appreciable change in direction due to the roll itself. The roll 38 is arranged however to bend the tube down by an amount sufficient to counteract the upward curving tendency and to insure the delivery of a tube sufficiently straight for handling. It should be noted that the straightening or bending action of roll 38 does not transmit any stress beyond the feed rolls 25 and 26 since the bending stress exerted by roll 37 is assumed and wholly neutralized by the upper feeding roll 25.

After the foregoing welding operation, the tubes are placed in an annealing furnace in which the temperature is raised substantially above the hot-short range (e. g. to 1900° F. for the alloy inconel). This serves not only fully to anneal the weld seam and to counteract any hardening resulting from any swaging operation to which it might have been subjected, but removes any slight residual strains and any coarse granular condition particularly in and adjacent the weld and resulting from the welding heat. No restraint is imposed on the tubes in the annealing furnace but they are left to curl at will under the annealing temperatures. Thus the imposition of any stresses on the metal is avoided as it passes through the hot-short range in the annealing furnace.

Thereafter the tubes are cooled (rapid cooling for inconel making the metal desirably soft) and then passed through a swaging machine over an internal mandrel where any sagging in the weld seam is removed. Preferably the tubes are also reduced slightly in diameter to remove variations in diameter and to produce a tube of exactly uniform diameter. Absolute uniformity in this respect is generally not attainable when the tube is first formed. Uniformity can much more easily be effected by swaging the tube down to a slightly smaller diameter after welding. Such operation also greatly improves the appearance of the weld seam, in fact substantially obliterating it.

If necessary the tubes are then passed through a straightening machine to remove slight curves and make them perfectly straight.

Obviously the invention is not limited to the details of the illustrative process and apparatus since these may be variously modified. Moreover it is not indispensable that all features of the invention be used conjointly since various features may be used to advantage in different combinations and sub-combinations.

Having described my invention, I claim:

1. The method of welding tubing made from metal having a hot-short range which is characterized by effecting a relative movement between the tube and the source of welding heat, adjusting such heat so as to bring the metal adjacent the seam to a welding temperature and supporting the tube in such a way as to allow it to curve naturally in the region which is in the hot-short temperature range, and then straightening the tube after it has passed out of such hot-short range.

2. The method of welding metals which are hot-short which is characterized by heating the metal to the welding temperature at the seam and supporting the same in such a way that the metal may assume its natural position throughout the length thereof which is in the vicinity of the range of temperatures where the metal is hot-short, thereby avoiding the application of stress to the metal while in the hot-short range.

3. The method of welding tubing made from metal having a hot-short range which is characterized by continuously advancing a tube to be welded past a source of welding heat directed against the tube adjacent the seam, allowing said tube to curve naturally under the action of the heat, and straightening the tube after it has passd out of the hot-short range.

4. The method of forming welded tubing which is characterized by forming a tube from a strip of metal, compressing the tube while cold until the edges to be welded are close together, then subjecting the tube to a welding heat which progressively melts the metal superficially in a small area adjacent the weld to allow the metal to fuse together without the exercise of external pressure at the point of fusion, thereby avoiding upsetting the metal at the weld.

5. The method of forming welded tubing which is characterized by forming a tube from a strip of metal, compressing the tube while cold until the edges to be welded are close together, moving the tube past a welding heat at a rate to produce a melt weld at the tube seam, and arranging supports for the tube in such position as to allow the tube freely to assume its natural curvature in its hot-short range under the action of the welding heat.

6. The method of butt welding metal which is hot-short which is characterized by spacing the edges to be welded into welding proximity before the metal reaches its hot-short temperature, passing the metal continuously past a source of welding heat at a rate to produce a melt weld by superficial melting of the metal, and arranging supports for the metal in such position as to allow it freely to assume its natural curvature as it moves through the hot-short range of temperatures.

7. The method of welding tubing or the like made from metal which is hot-short which is characterized by bringing the edges to be welded into welding proximity while cold, moving the tube continuously past a welding jet at a rate to cause the metal to fuse together, and supporting said tube during such movement to allow it freely to assume its natural position induced by the action of the welding heat while it is passing through its hot-short range.

8. The method of welding tubing made from metal having a hot-short range which is characterized by effecting a relative movement between the tube and the source of welding heat, adjusting such heat so as to bring the metal adjacent the seam to a welding temperature and supporting the tube in such a way as to allow it to curve naturally in the region which is in the hot-short temperature range, and then swaging the tube to reduce it to a uniform diameter.

9. The method of butt welding tubing or the like made from metal having a hot-short range which is characterized by forming a flat strip into tubular form, drawing the edges of the metal together in welding proximity while the tube is cold so that they will remain in such proximity without the exercise of external force, continuously passing the tube past a welding jet at a rate which produces a melt weld, supporting the tube during its movement so that it may freely assume its natural curvature during its passage through the hot-short range of temperatures, annealing said tube by raising it while unrestrained past the hot-short range, and then swaging the tube to reduce it to uniform diameter.

10. Apparatus for welding tubing made of metal having a hot-short range comprising in combination a welding torch, tube feeding devices arranged on opposite sides of said torch, said feeding devices being arranged relatively to the torch to support the tube in welding position when assuming its natural unrestrained curvature under the action of the welding heat, and means for driving said feeding devices to advance the tube continuously past the torch, said feeding devices being separated from the torch by distances sufficient to include the length of tube in the hot-short range of temperatures.

11. Apparatus for welding tubing made of metal having a hot-short range comprising in combination a welding torch, pairs of tube feeding rolls spaced on opposite sides of said torch, the leading pair of rolls being elevated above the line of feed of the trailing pair of rolls a distance to accommodate the downward curvature of the tube under the welding heat whereby the tube will naturally enter the trailing rolls without the application of directing forces to it, thereby avoiding the transfer of stresses to the portion of the tube in the hot-short range of temperatures.

12. Apparatus for welding tubing made of metal having a hot-short range comprising in combination means for applying a welding heat, means for advancing the tube past the welding heat including devices in advance of and beyond said welding heat, means to support the tube, said devices being arranged relatively to the welding heat means to support the tube in welding proximity to said welding heat means while assuming its natural unrestrained curvature under the action of the welding heat, said devices being separated from the welding heat means by distances sufficient to include the length of the tube in the hot-short range, said tube advancing means being operated to advance the tube continuously past the welding heat means.

ERNEST M. SIMS.